UNITED STATES PATENT OFFICE 2,538,959

PROCESS FOR MOLDING REFRACTORY OXIDES

Archibald H. Ballard, Niagara Falls, Ontario, Canada, assignor, by mesne assignments, to the United States of America as represented by the United States Atomic Energy Commission No Drawing. Application February 12, 1947, Serial No. 728,198

7 Claims. (Cl. 25—156)

Other objects will be in part obvious or in part pointed out hereinafter. The invention accordingly consists in the combination of elements and in the several steps and relation and order of each of said steps to one or more of the others thereof, all as will be illustratively described herein, and the scope of the application of which will be indicated in the following claims.

According to the invention I provide any refractory oxide more refractory than silica (quartz, M. P. 1470° C.) or any combination of refractory oxides all of which are more refractory than silica. The oxide or oxides should be pure, that is to say non-oxide material and/or silica and/or oxides less refractory than silica should not be present to an extent greater than 1%. Fluxes are not desired since according to the process of this invention, no substantial amount of material in liquid phase should be present during the molding hereinafter described. Soda, potash, lime, boric oxide, phosphoric oxide and the like are fluxes which should not be present in total amount greater than said one per cent and preferably even less. However, pure lime is refractory and can be used. The process of this invention involves recrystallization under pressure in contradistinction to what is commonly known as vitrification which involves a fluxing, or melting of one or more of the constituent oxides. Silica (quartz) has a relatively low melting point and with other oxides forms low melting glasses. Silica has no sharp melting point. Silica can assume an amorphous state where as the refractory oxides which are processed according to this invention are not found in a strictly amorphous state so far as I am aware. Amorphous silica is unstable in that it can crystallize. Silica is more easily reduced than the refractory oxides that are processed according to the present invention.

Any combination of oxides should be, as a combination, more refractory than silica. Thus while lime can be used alone, it should not be used in combination with other oxides in amounts sufficient to form a low melting phase.

I provide a refractory mold, including one or more mold plungers. Preferably the mold is made of graphite which is a most satisfactory material because it is refractory and is easily machinable. However other materials can be used such as titanium carbide, TiC, zirconium carbide, ZrC, tungsten carbide, WC, or vanadium carbide, VC. Or the oxides more refractory than silica may be used to mold each other except where a reaction would take place and excepting that the mold should not be made of the same oxide as the material to be molded, since if they were the same the latter would become integral with the former.

I further provide a pressure-sintering furnace, which may be an induction furnace with pressure plungers or a resistor tube furnace such as disclosed in the aforementioned patent to Ridgway No. 2,125,588. In fact any type of furnace which will heat the contents of a graphite mold, which furnace is also provided with means to exert pressure on the contents of the mold, may be used.

I have discovered that the objects of the invention can be achieved if the oxide to be molded is in the form of very fine particles, that is the major portion of the material being of ten microns or less in particle size, and 98% of the material consisting of particles none of which is larger than 50 microns. The process can be carried out with practically all of the refractory oxides above silica including the following: alumina, barium oxide, beryllia, cerium oxide, chromic oxide, lime, if pure, magnesia, strontium oxide, titania, thoria, uranium oxide, vanadium oxide, zirconia. Of these I have actualy tried, with successful results, the molding according to the invention of alumina, beryllia, magnesia, thoria and uranium oxide. I am confident that the others named can likewise be so molded.

The oxide should be of fine crystalline structure, without recrystallization. I prefer to use calcined material but which has not been fused, or heat treated at a temperature high enough to produce recrystallization. Thus, in the case of beryllia, I prefer to use powders which have been calcined at temperatures not higher than 1250° C. In the case of alumina I prefer the powders calcined at temperatures not higher than 1200° C. In the case of magnesia I prefer the product which is calcined at temperatures less than 1100° C. Thoria should be calcined at not exceeding about 1100° C. Uranium oxide of the formula $U_3O_8$, which is the green or black urano-uranic oxide if calcined at too high a temperature is converted to the acid anhydride $UO_3$ which is volatile, and therefore the calcining temperature should not exceed 1100° C. However, the temperature should be high enough to drive off nearly all water, water of crystallization, or products of decomposition, such as carbon dioxide.

The following is a table of typical calcining chemical reactions which will produce material suitable for use in this invention:

TABLE I

| Oxide | Calcining Reaction |
|---|---|
| Alumina 2Al(OH)$_3$ | 1000° C. Al$_2$O$_3$+3H$_2$O $\rightarrow$ |
| Beryllia 2BeSO$_4$ | 1150° C. 2BeO+2SO$_2$+O$_2$ $\rightarrow$ |
| Be(OH)$_2$ | 1150° C. BeO+H$_2$O $\rightarrow$ |
| Calcium Oxide CaCO$_3$ | 800° C. CaO+CO$_2$ $\rightarrow$ |
| Magnesia MgCO$_3$ | 1000° C. MgO+CO$_2$ $\rightarrow$ |
| Thoria Th(OH)$_4$ | 1000° C. ThO$_2$+2H$_2$O $\rightarrow$ |
| Uranium Oxide | Uranyl ammonium carbonate on calcination at above 300° C. produces the oxide U$_3$O$_8$ plus CO$_2$, NH$_3$, O$_2$ and water. This oxide U$_3$O$_8$ is, when heated in a graphite mold, reduced to UO$_2$. |

Such oxide powder, or mixture of such powders, is placed in a mold of graphite or other refractory material which may then be placed in the furnace tube 50 of the furnace of the Ridgway Patent No. 2,125,588 (hereinafter referred to as the Ridgway furnace). The furnace plungers 136 and 173 (Patent 2,125,588) are then placed in position as described in the patent and the electric current is turned on and the air pressure valves are turned to apply some pressure on the mold.

The tube 50 of the Ridgway furnace is a graphite tube. An important feature of the present invention is the use of relatively low temperatures, that is several hundred degrees below the fusing point of the oxide, contrary to Ridgway Patent No. 2,091,569 wherein a temperature close to the melting point of the oxide is advised. Specific examples of the preferred top temperature, as compared with the melting point, which should be employed for specific oxides are as follows:

TABLE II

| Oxide | Melting Point | The Highest Temperature During Molding Should preferably be between |
|---|---|---|
| Alumina | 2,050° C. | 1,650° C. and 1,750° C. |
| Beryllia | 2,570° C. | 1,650° C. and 1,800° C. |
| Magnesia | 2,800° C. | 1,250° C. and 1,325° C. |
| Thoria | Around 3,300° C. | 1,400° C. and 1,600° C. |
| Uranous Oxide UO$_2$ | 2,176° C. | 1,500° C. and 1,750° C. |

When articles are molded from the oxides of the characteristics and particle sizes specified herein, at temperatures which rise to the temperatures for the various oxides as specified in Table II, homogeneous pieces of almost theoretical density are produced. Furthermore the surfaces of these articles are free from any apparent reaction of the oxide with the graphite of the mold, that is to say there has been no reduction even on a surface layer. The articles are not spalled even though they have sharp dihedral, polyhedral and/or reentrant angles, and the articles can have ribs and grooves and can be made into many complicated shapes to high dimensional accuracy, i. e. as good as the mold. Because of the high density of these articles they are gas tight under a vacuum of as low as one micron of mercury. The articles are substantially integral pieces of the oxides in multicrystalline form with sufficient intercrystalline growth so that the articles have great strength. The articles fracture with a conchoidal fracture.

The actual density of articles made in accordance with the invention as compared to the published densities of the materials are as follows:

TABLE III

| Oxide | Real Density from International Critical Tables | Density of Articles Made in Accordance With the Invention |
|---|---|---|
| Alumina | 4.00 | 3.968 |
| Beryllia | 3.02 | 3.002 |
| Magnesia | 3.65 | 3.485 |
| Thoria | 9.69 | 9.404 |
| Uranium Oxide (UO$_2$) | 10.5 | 10.37 |

The apparatus involved in this invention, that is the mechanical details of the furnace, the electrical features of the furnace, the structure of the mold, and the structure and control of the pressure apparatus will all be found described in the above-mentioned U. S. patent to Ridgway, No. 2,125,588, which discloses and illustrates a graphite tube resistor type electric furnace of good efficiency. Many furnaces just like that illustrated in that patent are now in successful operation in the United States and in Canada. This present invention, however, is not limited to the simple mold shown in the above patent, since various shapes including crucibles, tubes, square and polygonal shapes with or without bores and with or without ribs or grooves or flanges can be molded using the process of the present invention.

The use of temperatures above the preferred molding temperature ranges of Table II is not precluded, but no advantage lies in going to temperatures above these ranges. The use of temperatures close to the melting point, however, will in most cases result in reduction of the oxide and the formation of an outer layer on the finished piece that is of poor quality. In the case of magnesia, approach to the melting point will reduce the magnesia to magnesium which will volatilize. In many other cases the raising of the material to a temperature approaching the melting point will result in the formation of carbides and nitrides with resulting disintegration of the molded piece on cooling. Again the attempt to mold these refractory oxides at temperatures approaching their melting points results in extreme crystal growth with a resultant weak product. Having thus given a table to show the practical range of temperatures that should be employed, and inasmuch as the top safe temperature is different for the different oxides, I can generalize by saying that in no case should the temperature of molding rise higher than 250° C. below the melting point of the oxide involved. In the case of alumina, reduction starts at temperatures not much above 1750° C. and 1800° C. is the upper limit for good results. In the case of beryllia the top temperature should be no higher than 1900° C. which is 670° C. below the melting point. In the case of magnesia a temperature above 1650° C. (1150° C. below the melting point) will cause marked reduction. Thoria will pick up nitrogen somewhere around 2000° C. Uranium oxide has two known refractory forms, U$_3$O$_8$ and UO$_2$. However, it matters not which is used, because in a graphite mold, U$_3$O$_8$ is reused to UO$_2$. The danger point for UO$_2$ is around 1900° C. at which temperature the oxide begins to be reduced to the carbide of uranium.

It is possible by using the process of the invention not only to produce exact shapes according to the shapes of the molds, but also to achieve great dimensional accuracy. To do this, account has to be taken of the coefficients of expansion of the graphite and of the oxide material, which is given in the following table:

TABLE IV

Coefficient of expansion, all figures $\times 10^{-6}$ per degree centigrade, all figures approximate

| Oxide | Coefficient | Good as an Average Over Temperature Range Below |
|---|---|---|
| | | °C. |
| Alumina | 6.3 | 20–1,750 |
| Beryllia | 7.8 | 20–1,800 |
| Graphite | 3.7 to 5.4 | 20–2,000 |
| Magnesia | 11.6 | 20–1,280 |
| Thoria | 10.3 | 20–1,400 |
| Uranium Oxide, $UO_2$ | About 10 | 20–1,700 |

For the axial dimension of a piece, calculation should be made not only from the above table but also from Table III, densities. Using these tables, with extrapolation if necessary, pieces of beryllia have been made to required dimensions within ±.010 inch. The other oxides can be made into pieces to similar dimensional accuracy.

The molding pressure is preferably as high as the graphite mold or other mold will stand, and in any event 500 pounds to the square inch or more. In many cases I have used 1500 pounds per square inch pressure. The figures mentioned are top pressures and the pressure should gradually rise thereto. The use of low pressures necessitates the use of more time and the most practical thing to do is to provide a graphite mold of adequate strength and then use the indicated pressure of 1500 pounds per square inch which I believe to be satisfactory for all of the oxides more refractory than silica (quartz).

It will thus be seen, that there has been provided by this invention, a process for the molding of very dense, homogeneous refractory articles of oxides more refractory than silica in which the various objects hereinbefore given together with many thoroughly practical advantages are successfully achieved. As various other embodiments might be made of the above invention, and as the art herein described might be varied in various parts, all without departing from the scope of the present invention, it is to be understood that all matter hereinbefore set forth is to be interpreted as illustrative and not in a limiting sense.

I claim:

1. Process of molding a homogeneous, dense, integral article of beryllia which comprises providing a refractory mold including a hollow mold body and at least one mold plunger, providing a powder of beryllia of fine crystalline structure which has been obtained by calcination at a temperature below 1100° C. and which has not been recrystallized, the major portion of which is of particle size not greater than ten microns and 98% of which consists of particles none of which is larger than 50 microns particle size, placing said powder in said mold and said mold in a furnace having pressure apparatus, and heating while pressing to a temperature and pressure which rise to between about 1650° C. and 1900° C. and at least about 500 lbs. per square inch.

2. Process of molding a homogeneous, dense, integral article of thoria which comprises providing a refractory mold including a hollow mold body and at least one mold plunger, providing a powder of thoria of fine crystalline structure which has been obtained by calcination at a temperature below 1100° C. and which has not been recrystallized, the major portion of which is of particle size not greater than ten microns and 98% of which consists of particles none of which is larger than 50 microns particle size, placing said powder in said mold and said mold in a furnace having pressure apparatus, and heating while pressing to a temperature and pressure which rise to between about 1400° C. and 2000° C. and at least about 500 lbs. per square inch.

3. The process of molding a homogeneous, dense, integral article of uranium oxide which comprises providing a refractory mold including a hollow mold body and at least one mold plunger, providing a powder of uranium oxide of fine crystalline structure which has been obtained by calcination at a temperature below 1100° C. and which has not been recrystallized, the major portion of which is of particle size not greater than ten microns and 98% of which consists of particles none of which is larger than 50 microns particle size, placing said powder in said mold and said mold in a furnace having pressure apparatus, and heating while pressing to a temperature and pressure which rise to between about 1500° C. and 1900° C. and at least about 500 lbs. per square inch.

4. The process of molding a homogeneous, dense, integral article of an oxide having a melting point of at least about 1850° C. or mixture of such oxides except with lime which comprises providing a refractory mold including a hollow mold body and at least one mold plunger, providing a powder of the refractory oxide material of fine crystalline structure which has been obtained by calcination at a temperature below 1250° C. and which has not been recrystallized, the major portion of which is of particle size not greater than ten microns and 98% of which consists of particles none of which is larger than 50 microns particle size, placing said powder in said mold and said mold in a furnace with pressure apparatus, and heating while pressing to a temperature and pressure which rise to at least 1250° C. and not higher than 250° C. below the melting point of the oxide or combination of oxides and at least about 500 lbs. per square inch.

5. The process of molding a homogeneous, dense, integral article of oxide selected from the group consisting of alumina, barium oxide, beryllia, cerium oxide, chromic oxide, pure lime, magnesia, strontium oxide, titania, thoria, uranium oxide, vanadium oxide, zirconia and mixtures thereof except with lime, which comprises providing a refractory mold including a hollow mold body and at least one mold plunger, providing a powder of the refractory oxide material of fine crystalline structure which has been obtained by calcination at a temperature below 1250° C. and which has not been recrystallized, the major portion of which is of particle size not greater than ten microns and 98% of which consists of particles none of which is larger than 50 microns particle size, placing said powder in said mold and said mold in a furnace with pressure apparatus, and heating while pressing to a temperature and pressure which rise to at least 1250° C. and not higher than 250° C. below the melting point of the oxide or combination of oxides and at least about 500 lbs. per square inch.

6. The process of molding a homogeneous, dense, integral article of magnesia which comprises providing a refractory mold including a hollow mold body and at least one mold plunger, providing a powder of magnesia of fine crystalline structure which has been obtained by calcination at a temperature less than 1100° C. and which has not been recrystallized, the major portion of which is of particle size not greater than 10 microns and 98% of which consists of particles none of which is larger than 50 microns particle size, placing said powder in said mold and said mold in a furnace having pressure apparatus, and heating while pressing to a temperature and pressure which rise to between about 1250° C. and 1650° C. and at least about 500 pounds per square inch.

7. The process of molding a homogeneous, dense, integral article of alumina which comprises providing a refractory mold including a hollow mold body and at least one mold plunger, providing a powder of alumina of fine crystalline structure which has been obtained by calcination at a temperature below 1200° C. and which has not been recrystallized, the major portion of which is of particle size not greater than 10 microns and 98% of which consists of particles none of which is larger than 50 microns particle size, placing said powder in said mold and said mold in a furnace having pressure apparatus, and heating while pressing to a temperature and pressure which rise to between about 1650° C. and 1800° C. and at least about 500 pounds per square inch.

ARCHIBALD H. BALLARD.

REFERENCES CITED

The following references are of record in the file of this patent:

UNITED STATES PATENTS

| Number | Name | Date |
|---|---|---|
| 2,091,569 | Ridgway et al. | Aug. 31, 1937 |